(12) United States Patent
Lehtinen et al.

(10) Patent No.: US 10,866,990 B2
(45) Date of Patent: Dec. 15, 2020

(54) BLOCK-BASED LOSSLESS COMPRESSION OF GEOMETRIC DATA

(71) Applicant: NVIDIA Corporation, Santa Clara, CA (US)

(72) Inventors: Jaakko Lehtinen, Helsinki (FI); Timo Oskari Aila, Tuusula (FI); Tero Tapani Karras, Helsinki (FI); Alexander Keller, Berlin (DE); Nikolaus Binder, Berlin (DE); Carsten Alexander Waechter, Berlin (DE); Samuli Matias Laine, Vantaa (FI)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/502,415

(22) Filed: Jul. 3, 2019

(65) Prior Publication Data

US 2019/0324991 A1    Oct. 24, 2019

Related U.S. Application Data

(63) Continuation of application No. 14/737,343, filed on Jun. 11, 2015, now abandoned.
(Continued)

(51) Int. Cl.
*G06T 17/10* (2006.01)
*G06F 16/901* (2019.01)
*G06F 16/25* (2019.01)
*G06F 16/22* (2019.01)
*G06T 9/40* (2006.01)
(Continued)

(52) U.S. Cl.
CPC ...... *G06F 16/9027* (2019.01); *G06F 16/2246* (2019.01); *G06F 16/254* (2019.01); *G06T 1/60* (2013.01); *G06T 9/40* (2013.01); *G06T 15/005* (2013.01); *G06T 15/06* (2013.01); *G06T 15/08* (2013.01); *G06T 15/10* (2013.01); *G06T 15/80* (2013.01); *G06T 17/10* (2013.01); *H04N 19/174* (2014.11); *H04N 19/44* (2014.11)

(58) Field of Classification Search
CPC .... G06T 17/20; G09G 2340/02; G06F 16/901
See application file for complete search history.

(56) References Cited

U.S. PATENT DOCUMENTS

| | | |
|---|---|---|
| 2003/0184555 A1 | 10/2003 | Fraser |
| 2004/0100474 A1 | 5/2004 | Demers et al. |

(Continued)

OTHER PUBLICATIONS

Segovia, B., et al., "Memory Efficient Ray Tracing with Hierarchical Mesh Quantization," Graphics Interface Conference 2010, May 31-Jun. 2, 2010, pp. 153-160.

*Primary Examiner* — Yi Yang
(74) *Attorney, Agent, or Firm* — Leydig, Voit & Mayer, Ltd.

(57) ABSTRACT

An apparatus, computer readable medium, and method are disclosed for decompressing compressed geometric data stored in a lossless compression format. The compressed geometric data resides within a compression block sized according to a system cache line. An indirection technique maps a global identifier value in a linear identifier space to corresponding variable rate compressed data. The apparatus may include decompression circuitry within a graphics processing unit configured to perform ray-tracing.

24 Claims, 9 Drawing Sheets

Related U.S. Application Data

(60) Provisional application No. 62/046,093, filed on Sep. 4, 2014.

(51) Int. Cl.
*G06T 15/00* (2011.01)
*G06T 15/06* (2011.01)
*G06T 15/80* (2011.01)
*G06T 15/08* (2011.01)
*G06T 15/10* (2011.01)
*H04N 19/174* (2014.01)
*H04N 19/44* (2014.01)
*G06T 1/60* (2006.01)

(56) References Cited

U.S. PATENT DOCUMENTS

| | | |
|---|---|---|
| 2007/0085714 A1 | 4/2007 | Levy |
| 2008/0228933 A1 | 9/2008 | Plamondon |
| 2009/0110305 A1 | 4/2009 | Fenney |
| 2009/0189890 A1 | 7/2009 | Corbett et al. |
| 2010/0169382 A1 | 7/2010 | Sheaffer et al. |
| 2010/0235146 A1* | 9/2010 | Bennett ............... G06F 30/00 703/1 |
| 2010/0316113 A1 | 12/2010 | Jang et al. |
| 2011/0310102 A1 | 12/2011 | Chang |
| 2012/0229464 A1 | 9/2012 | Fishwick |
| 2013/0326190 A1 | 12/2013 | Chung et al. |
| 2013/0339472 A1 | 12/2013 | Ruellan et al. |
| 2014/0354666 A1 | 12/2014 | Yang |
| 2014/0358876 A1 | 12/2014 | Bhattacharjee et al. |
| 2015/0070372 A1 | 3/2015 | Fries et al. |

* cited by examiner

BLOCK-BASED LOSSLESS COMPRESSION OF GEOMETRIC DATA

CLAIM OF PRIORITY

This application is a continuation of U.S. Non-Provisional application Ser. No. 14/737,343 titled "Block-Based Lossless Compression of Geometric Data," filed Jun. 11, 2015 which claims the benefit of U.S. Provisional Application No. 62/046,093 titled "Bounding Volume Hierarchy Representation and Traversal," filed Sep. 4, 2014, the entire contents of which are incorporated herein by reference.

FIELD OF THE INVENTION

The present invention relates to numerical geometric data representation, and more particularly to block-based lossless compression and decompression of numerical geometric data.

BACKGROUND

Three-dimensional (3D) computer graphics rendering techniques may generate a two-dimensional (2D) representation of a 3D scene. A given 3D scene is typically represented as a collection of geometric primitives (e.g., points, lines, triangles, quads, meshes, etc.). Each geometric primitive may include vertex information represented as floating-point values. For example, a triangle primitive may include three vertices, and each one of the three vertices may include a 3D coordinate represented as an ordered set of three floating-point values.

Object-based rasterization and ray tracing are two commonly implemented techniques for generating a 2D representation of a 3D scene. Both techniques frequently access geometric primitive data stored in memory and generate intensive memory bandwidth demands. Because the number of geometric primitives in a typical scene may be quite large (e.g., on the order of many millions of triangles, etc.), memory bandwidth limitations may constrain overall rendering performance. Thus, there is a need for addressing these issues and/or other issues associated with the prior art.

SUMMARY

An apparatus, computer readable medium, and method are disclosed for generating decompressed geometric data from a compression block. The method comprises receiving a compression block configured to store a header and compressed geometric data for at least two geometric primitives and identifying a location within the compression block of a first set of compressed geometric data for a first geometric primitive of the at least two geometric primitives, based on a first local index. The method also includes generating a first set of decompressed geometric data for the first geometric primitive by decompressing the first set of compressed geometric data, based on at least a first anchor value, where the first set of decompressed geometric data comprises more bits of data than the first set of compressed geometric data.

The apparatus may comprise circuitry within a processing unit, such as a graphics processing unit (GPU), or a parallel processing unit, decompression unit, or memory interface unit therein. The apparatus may include circuitry to implement one or more decompression techniques for decompressing vertex information associated with triangle primitives. Other embodiments include software, hardware, and systems configured to perform method steps for generating decompressed geometric data from the compression block.

DETAILED DESCRIPTION

Figure 1A:
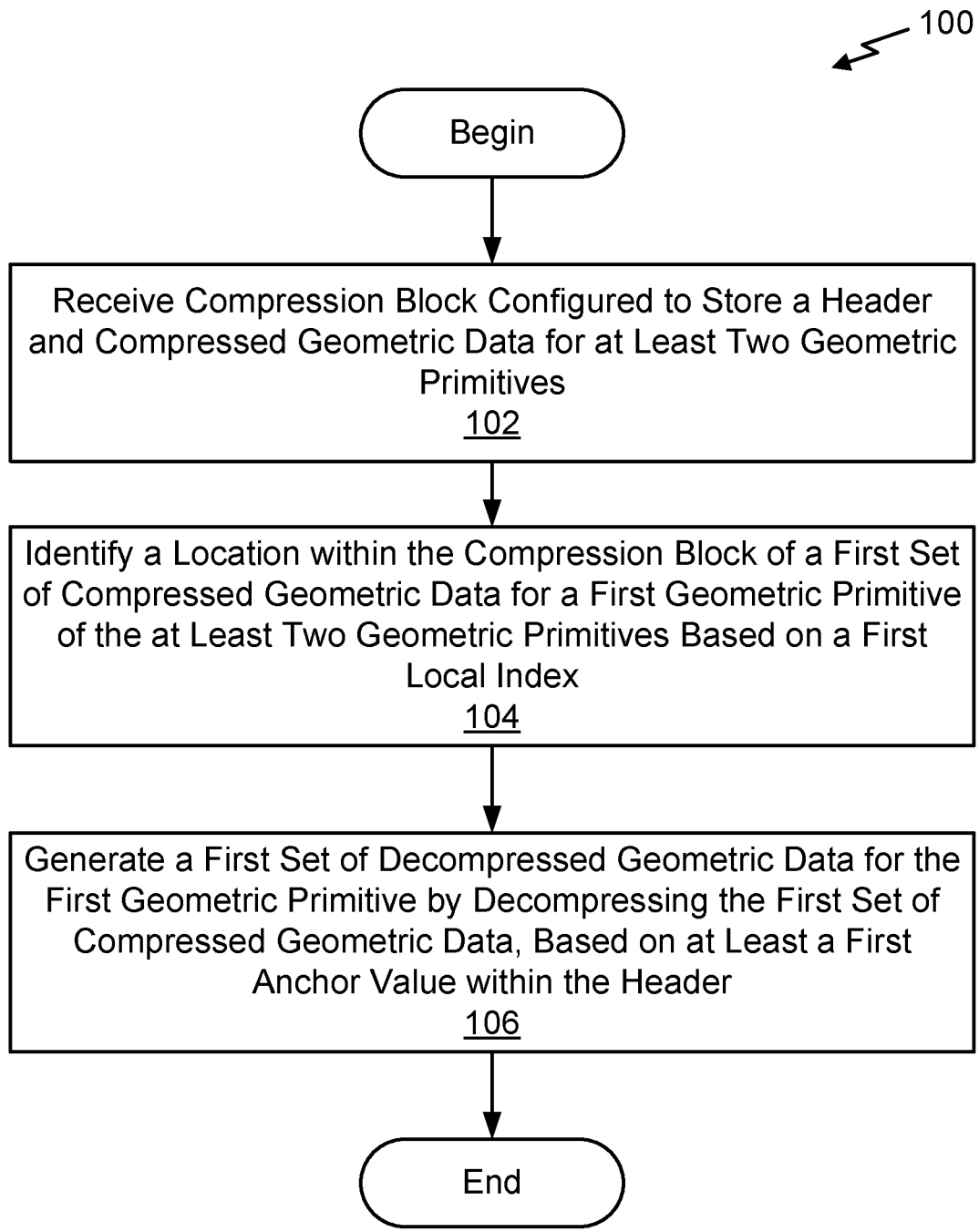
FIG. 1A illustrates a flowchart of a method for generating decompressed geometric data from a compression block, in accordance with one embodiment.

Three-dimensional (3D) graphics rendering techniques typically represent a 3D scene as a collection of geometric primitives. Each geometric primitive may include geometric data such as vertex coordinates, texture coordinates, or any other technically relevant information. The collection of geometric primitives may be stored in a memory subsystem and accessed from the memory subsystem to render the scene. In certain embodiments of the present invention, scene rendering is performed, at least in part, by a graphics processing unit (GPU), and the collection of geometric primitives representing a given 3D scene is stored in a memory subsystem coupled to the GPU.

Geometric data for one or more geometric primitives may be stored within a compression block. Each compression block may correspond in size to a cache line within the GPU. The collection of geometric primitives for the 3D scene may be stored in a plurality of compression blocks, with a variable number of geometric primitives stored in any one compression block. The number of geometric primitives stored within a given compression block is a function of data similarity of geometric data values for associated geometric primitives. The compression blocks may be identified by a compression block number, with sequential compression blocks having corresponding sequential compression block numbers. Furthermore, sequential compression blocks may provide storage for sequentially identified geometric primitives.

Each geometric primitive may be identified using a unique identifier, such as a unique thirty-two bit integer value. The unique identifier may also be described as a global identifier because each value is globally unique within an identifier space for primitives. Accessing data for a given geometric primitive specified by an associated identifier involves first locating an appropriate compression block within the memory subsystem where the geometric primitive resides. A mapping data structure may be constructed to locate the appropriate compression block and data for the geometric primitive. The mapping data structure accounts for the variable number of geometric primitives stored in each compression block associated with the 3D scene.

Rendering techniques based on ray tracing may organize 3D primitives occupying a 3D space using a bounding volume hierarchy (BVH), a data structure designed to efficiently encode spatial relationships among 3D objects comprising sets of 3D primitives. Each 3D primitive within the BVH may be represented as a bounding volume, such as an axis-aligned bounding box (AABB), defined by a pair of bounding planes in each of three dimensions. Geometric primitives within a given AABB may include spatially similar coordinate positions and corresponding numeric representations of associated geometric data, such as vertex coordinates, may include similar bit patterns. In certain usage cases, the similar coordinate positions may align to powers of two fractional increments corresponding to an authoring tool grid resolution. Furthermore, geometric primitives associated with fans or meshes may include common vertex coordinates. Similar and common numeric information associated with geometric primitives may be identified as the basis for compression of the numeric information.

In one embodiment of the present invention geometric data stored within a compression block is decompressed. Certain embodiments of the present invention implement logic circuitry within the GPU that receives a primitive identifier associated with a geometric primitive and returns geometric data for the geometric primitive. The logic circuitry may be associated with a memory controller or a processing core within the GPU to provide transparent decompression of geometric data. Compression of uncompressed geometric data may be implemented using any technically feasible technique that generates suitably formatted compression blocks.

FIG. 1A illustrates a flowchart of a method 100 for generating decompressed geometric data from a compression block, in accordance with one embodiment. Although method 100 is described in conjunction with the systems of FIGS. 1G-4, persons of ordinary skill in the art will understand that any system that performs method 100 is within the scope of embodiments of the present invention. In one embodiment, a decompression unit, such as decompression unit 196 of FIG. 1G is configured to perform method 100. The decompression unit may reside within memory partition unit 280 of FIG. 2, or within any other technically feasible circuitry associated with parallel processing unit (PPU) 200 of FIG. 2. In other embodiments, the decompression unit may reside within any technically feasible functional unit or units associated with a computer system architecture. The decompression unit may be implemented using function-specific logic circuitry, such as a function-specific portion of a processing pipeline configured to perform at least method 100. Alternatively, the decompression unit may be implemented as instructions or microcode for controlling a processing unit. The instructions may be encoded within non-transitory computer-readable medium such as a read-only solid-state memory or a programmable solid-state flash memory.

Method 100 begins at step 102, where the decompression unit receives a compression block configured to store a header and compressed geometric data for at least two geometric primitives. Each of the at least two geometric primitives is associated with a local index within the compression block. The local index may be determined based on a global identifier of the primitive that uniquely identifies a geometric primitive within a set of geometric primitives that collectively define a 3D scene.

The header may include at least one mode bit that indicates whether geometric data within the compression block is stored in an uncompressed format or in a compressed format. In certain cases, it may be desirable to store the geometric data in an uncompressed format. The uncompressed format may be compatible with a compressed format for representing other geometric data that is compressed. In other cases, the geometric data compresses according to a data-dependent compression ratio, allowing geometric data representing a variable number of geometric primitives to be stored within the compression block. An uncompressed format for representing geometric data is described in more detail in conjunction with FIG. 1B and a compressed format for representing geometric data is described in more detail in conjunction with FIG. 1C. In one embodiment, method 100 is applied to data in the compressed format illustrated in FIG. 1C.

Multiple compression blocks may be stored in a memory subsystem, and each of the multiple compression blocks may represent geometric data in the compressed format or the uncompressed format, as indicated by the at least one mode bit. Each of the multiple compression blocks may include geometric data for multiple geometric primitives, such as triangles. All geometric data for any one geometric primitive (e.g. one triangle) may reside entirely within one associated compression block. In the compressed format, geometric data for a varying number of geometric primitives may reside within the compression block. Consequently, geometric data for a specific geometric primitive may be located at a variable location within the compression block. In one embodiment, the variable location is a function of the number of geometric primitives represented within the compression block. The variable location, along with location information for geometric data associated with other geometric primitives within the compression block is recorded within a topology field of the compression block.

At step 104, based on the first local index, the decompression unit identifies a location within the compression block of a first set of compressed geometric data for a first geometric primitive of the at least two geometric primitives. In one embodiment, the first local index is received in conjunction with receiving the compression block. In one embodiment, the first geometric primitive is a triangle and the first set of compressed geometric data comprises three vertex positions, each of which includes a three-dimensional coordinate.

Each three-dimensional coordinate may include three floating-point values, which may be stored in a compressed format. Each of the three floating-point values may be stored using a compressed representation of a thirty-two bit floating-point encoding. Alternatively, each three-dimensional coordinate may include three fixed-point values, three integer values, or three values defined by any technically feasible numeric representation, any of which may be stored in a compressed format. A second local index may be received in conjunction with receiving the compression block for identifying a second set of compressed geometric data for a second geometric primitive. One or more vertex positions associated with the second geometric primitive may be represented as references to equivalent vertex positions associated with the first geometric primitive.

At step 106, the decompression unit generates a first set of decompressed geometric data for the first geometric primitive by decompressing the first set of compressed geometric data based on at least a first anchor value. In one embodiment, the first anchor value is one of three anchor values of a three-dimensional anchor position. Each one of the three anchor values may correspond to one of the dimensions of the three-dimensional anchor position. Additional geometric primitive vertex positions may be represented using three-dimensional offsets relative to the three-dimensional anchor position. In one embodiment, the anchor position may serve as one vertex position (e.g. vertex position zero), while other vertex positions are defined as offsets relative to the anchor position. In such an embodiment, the first set of decompressed geometric data includes three vertex positions, each comprising a three-dimensional position. Each of the three vertex positions may be represented within the compression block as a three-dimensional offset position relative to the three-dimensional anchor position. Each three-dimensional offset position may be represented as a set of compressed numeric values, and each of the compressed numeric values may be compressed according to a different compression ratio.

Figure 1B:
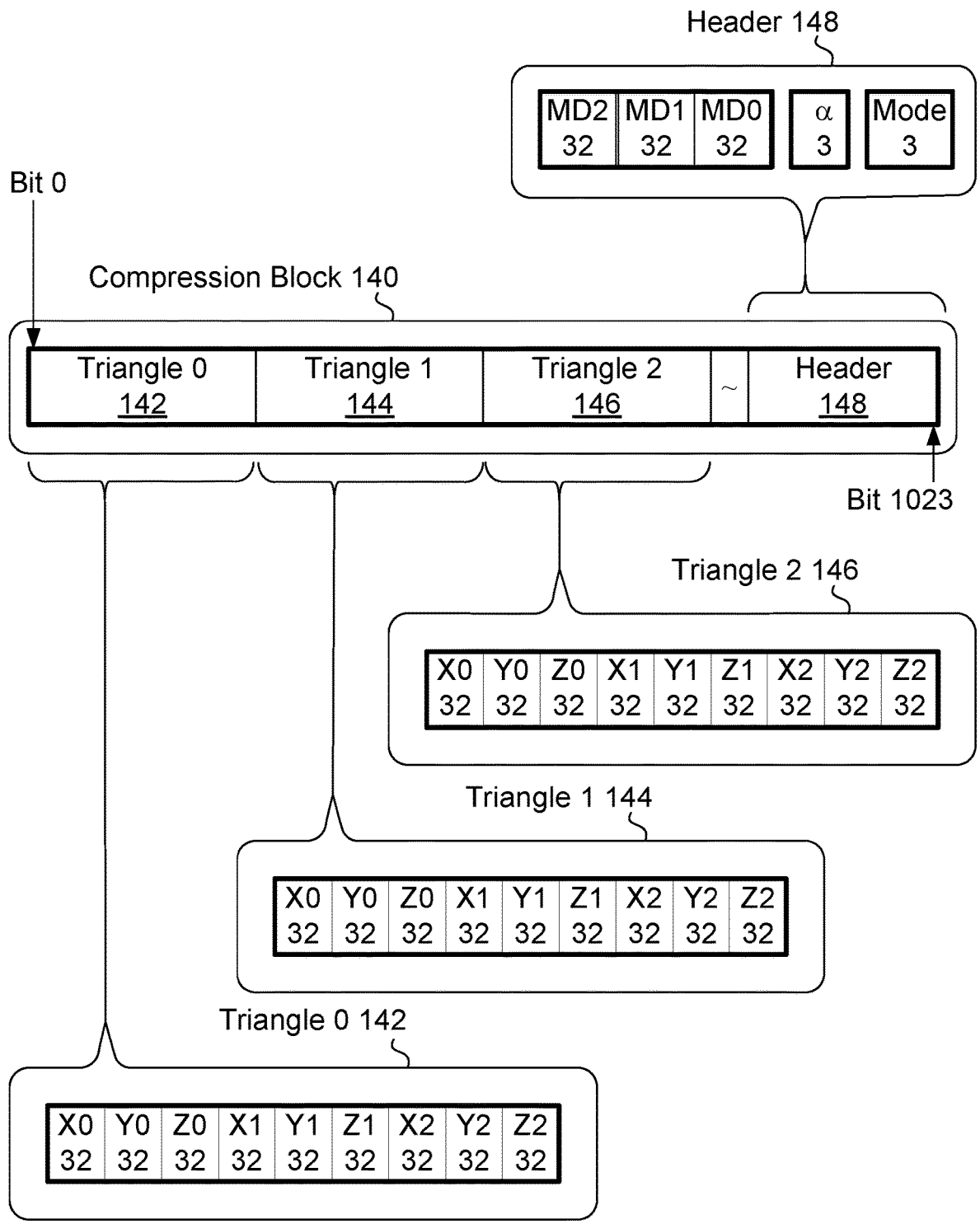
FIG. 1B illustrates a compression block structure configured to store uncompressed triangle data, in accordance with one embodiment.

FIG. 1B illustrates a compression block 140 configured to store uncompressed triangle data, in accordance with one embodiment. In such an embodiment, compression block 140 includes one-thousand twenty-four (1024 or 2^10) bits, starting at bit 0 and ending at bit 1023. As shown, compression block 140 includes a header field 148, a triangle 0 field 142, a triangle 1 field 144, and a triangle 2 field 146. Each field 142, 144, 146, 148 includes subfields, and each subfield is labeled with a bit count in a second line. For example, the subfield labeled "Mode" of header field 148 includes three bits, as indicated by the "3" on the second line for the subfield. The mode subfield specifies how to interpret other bits within compression block 140. At least one of the possible eight different bit codes for the mode subfield specifies that compression block 140 should be interpreted as shown here, having data for three different triangles stored in an uncompressed format.

Header 148 may also include three alpha (a) bits, an MD2 subfield having 32 bits, an MD1 subfield having 32 bits, and an MD0 subfield having 32 bits. In one embodiment, subfield MD2 stores an application-specific triangle metadata value associated with a triangle 2, subfield MD1 stores a triangle metadata value associated with a triangle 1, and subfield MD0 stores a triangle metadata value associated with triangle 0. Furthermore, each of the three alpha bits may indicate whether a corresponding triangle (e.g., triangle 2, triangle 1, triangle 0) is fully opaque or, alternatively, partially transparent).

Geometric data for triangle 0 is stored within triangle 0 field 142, geometric data for triangle 1 is stored within triangle 1 field 144, and geometric data for triangle 2 is stored within triangle 2 field 146. As shown, triangle 0 field 142 includes three vertices. A first of the three vertices may include coordinates (X0, Y0, Z0), specified by corresponding 32-bit values. A second of the three vertices may include coordinates (X1, Y1, Z1), specified by corresponding 32-bit values. A third of the three vertices may include coordinates (X2, Y2, Z2), specified by corresponding 32-bit values.

In other embodiments, compression block 140 may include a different number of bits specified as a power of two, such as 512 (2^9) bits, 2048 (2^11) bits, or 4096 (2^12) bits. In alternative embodiments, compression block 140 may include a number of bits that is not an integer power of two. In certain embodiments, the number of bits included within compression block 140 corresponds to the number of bits included within a cache line for an associated processing unit. Compression block 140 is structured to be compatible with other formats that store geometric data in a compressed format, as illustrated below in FIG. 1C.

Figure 1C:
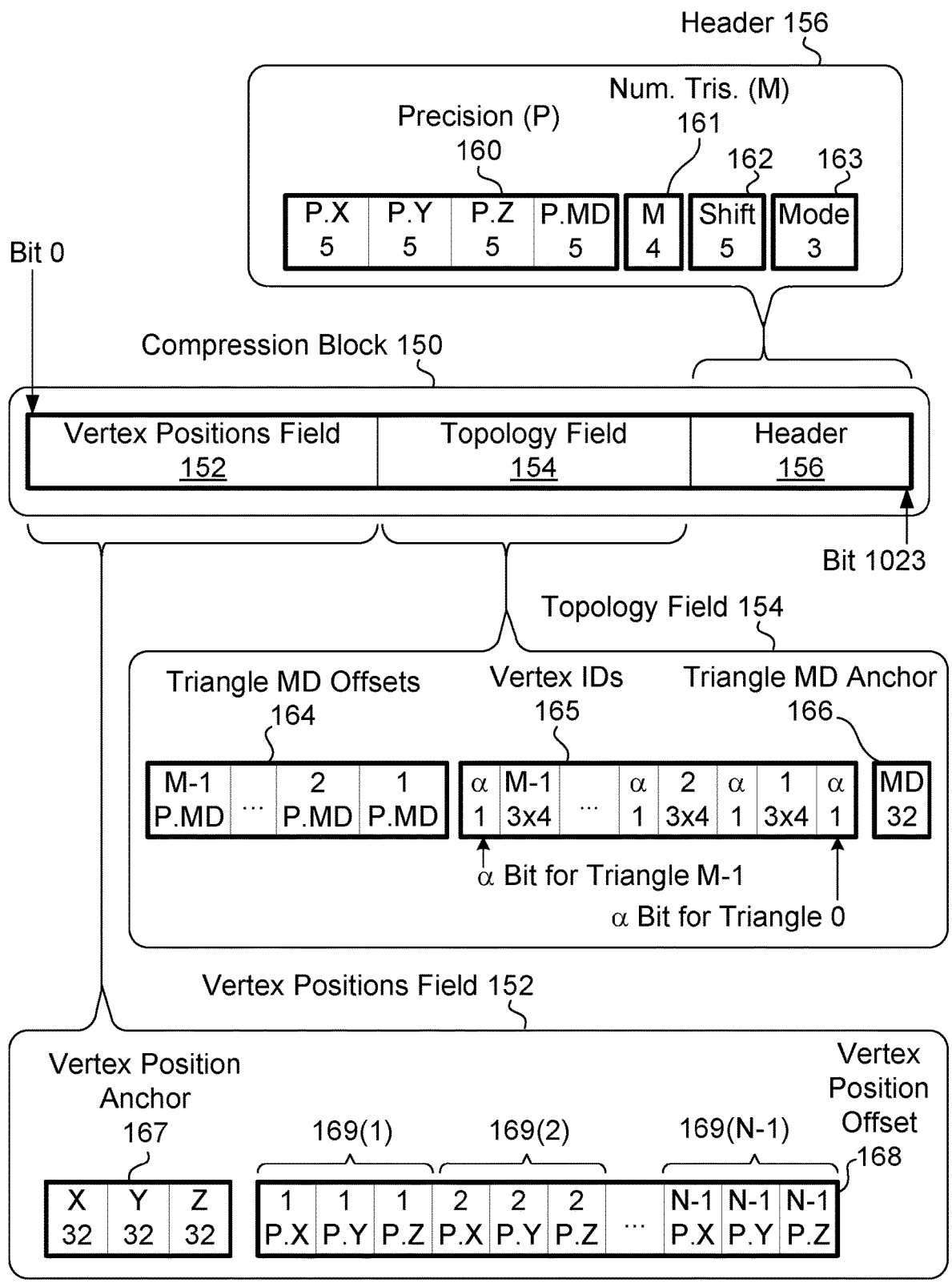
FIG. 1C illustrates a compression block structure configured to store compressed triangle data, in accordance with one embodiment.

FIG. 1C illustrates a compression block 150 configured to store compressed triangle data, in accordance with one embodiment. In such an embodiment, compression block 150 includes one-thousand twenty-four (1024 or 2^10) bits, starting at bit 0 and ending at bit 1023. As shown, compression block 150 includes a vertex positions field 152, a topology field 154, and header field 156.

Header field 156 includes a precision subfield 160, a number of triangles subfield 161, a shift subfield 162, and a mode subfield 163. Consistent with compression block 140 of FIG. 1B, mode subfield 163 includes three bits and specifies how to interpret the remaining bits of compression block 150 from a set of enumerated compression block formats. Compression block 140 illustrates one such format, and compression block 150 illustrates another such format. Mode subfield 163 and the mode subfield of compression block 140 occupy the same upper bits (bit 1023, bit 1022, and bit 1021) of a 1024 bit compression block format. In other embodiments, mode subfield 163 may include a different number of bits.

Precision subfield 160 includes subfields P.X, P.Y, P.Z, and P.MD. In one embodiment, the subfields P.X, P.Y, P.Z, and P.MD of precision subfield 160 each include five bits. Precision subfield P.X specifies a number of bits for representing vertex position offsets in the x-dimension within compression block 150, precision subfield P.Y specifies a number of bits for representing vertex position offsets in the y-dimension within compression block 150, and precision subfield P.Z specifies a number of bits for representing vertex position offsets in the z-dimension within compression block 150. Precision subfield P.MD specifies a number of bits for a triangle metadata offset. The number of triangles stored within compression block 150 is indicated by the number of triangles subfield 161. Precision subfields P.X, P.Y, P.Z, and P.MD, along with number of triangles subfield 161 may store a given value represented by the value minus one. For example, to indicate eight bits of precision for position offsets in the x-dimension, precision subfield P.X may store a value of seven. In one embodiment, shift subfield 162 indicates the lowest bit position affected when position offsets 169 are combined with values in vertex position anchor subfield 167.

Vertex positions field 152 includes a vertex position anchor subfield 167 and a vertex position offset subfield 168. As shown, vertex position anchor subfield 167 includes subfields for X, Y, and Z. In one embodiment, vertex position anchor subfield 167 comprises the three-dimensional anchor position of FIG. 1A. Furthermore, each of the subfields X, Y, Z within the vertex position anchor subfield 167 may represent a thirty-two bit floating-point value. Three-dimensional position offsets 169 from the three-dimensional position anchor are represented by X, Y, and Z offsets within vertex position offset subfield 168. Each three-dimensional position offset 169 represents a corresponding vertex position within a three-dimensional space. Position offset 169(1) being associated with vertex position one, position offset 169(2) being associated with vertex position two, and so forth. Each position offset 169 may be combined to the three-dimensional anchor position to generate a corresponding vertex position. The three-dimensional anchor position may be associated with vertex position zero so that a reference to vertex position zero refers to the anchor position.

In one embodiment, a vertex position x coordinate is generated by combining a vertex position offset x value 169 with a vertex position anchor x value from vertex position anchor 167 by replacing the P.X lowest bits of the vertex position anchor x value by the vertex position offset x value 169, a vertex position y coordinate is generated by combining a vertex position offset y value 169 with a vertex position anchor y value from vertex position anchor 167 by replacing the P.Y lowest bits of the vertex position anchor y value by the vertex position offset y value 169, and a vertex position z coordinate is generated by combining a vertex position offset z value 169 with a vertex position anchor z value from vertex position anchor 167 by replacing the P.Z lowest bits of the vertex position anchor z value by the vertex position offset z value 169.

In another embodiment, a vertex position x coordinate is generated by combining a vertex position offset x value 169 with a vertex position anchor x value from vertex position anchor 167 by replacing bits SHIFT 162 . . . SHIFT+P.X−1 of the vertex position anchor x value by the vertex position offset x value 169, a vertex position y coordinate is generated by combining a vertex position offset y value 169 with a vertex position anchor y value from vertex position anchor 167 by replacing bits SHIFT 162 . . . SHIFT+P.Y−1 of the vertex position anchor y value by the vertex position offset y value 169, and a vertex position z coordinate is generated by combining a vertex position offset z value 169 with vertex position anchor z value from vertex position anchor 167 by replacing bits SHIFT 162 . . . SHIFT+P.Z−1 of the vertex position anchor z value by the vertex position offset z value 169.

In yet another embodiment, a vertex position x coordinate is generated by combining a vertex position offset x value 169 with a vertex position anchor x value from vertex position anchor 167 by performing a binary integer addition of vertex position anchor x value and the vertex position offset x value 169, a vertex position y coordinate is generated by combining a vertex position offset y value 169 with vertex position anchor y value 167 by performing a binary integer addition of vertex position anchor y value and vertex position offset y value 169, and a vertex position z coordinate is generated by combining a vertex position offset z value 169 with vertex position anchor z value 167 by performing a binary integer addition of the vertex position anchor z value and the vertex position offset z value 169. Optionally, the vertex position offset values 169 may be sign-extended to 32 bits before the binary integer addition is performed.

In still yet another embodiment, a vertex position x coordinate is generated by combining a vertex position offset x value 169 with a vertex position anchor x value from vertex position anchor 167 by performing a binary integer addition of the vertex position offset x value 169 shifted left by a number of bit positions specified by a shift value stored in the SHIFT subfield 162 and a vertex position anchor x value from vertex position anchor 167, a vertex position y coordinate is generated by combining a vertex position offset y value 169 with a vertex position anchor y value from vertex position anchor 167 by performing a binary integer addition of the vertex position offset y value 169 shifted left by a number of bit positions specified by a shift value stored in the SHIFT subfield 162 and a vertex position anchor y value from vertex position anchor 167, a vertex position z coordinate is generated by combining a vertex position offset z value 169 with a vertex position anchor z value from vertex position anchor 167 by performing a binary integer addition of the vertex position offset z value 169 shifted left by a number of bit positions specified by a shift value stored in the SHIFT subfield 162 and a vertex position anchor z value from vertex position anchor 167. Optionally, the vertex position offset values 169 may be sign-extended to 32 bits before the left shift and the binary integer addition are performed.

Each vertex position may be referenced by one or more triangles stored within the compression block 150. For example, a first triangle forming a quad may share two vertices with a second triangle forming the quad. If the first triangle and the second triangle are stored within the same compression block 150, then vertex position information for each of the two shared vertices need only be stored once within compression block 150. Vertex positions for the first triangle may include references to the two shared vertex positions as well as a reference to a third vertex position. Similarly, vertex positions for the second triangle may include references to the two shared vertex positions as well as a reference to a fourth vertex position. In total, the quad needs only four vertex positions represented within compression block 150 rather than six because two are shared.

Each dimension of each vertex position offset may include a different number of bits of precision. For example, the x-dimension offset may be specified by a number of bits shown as P.X, which corresponds to a value (stored as the value minus one) in the X subfield of precision subfield 160 of header field 156. Very different precision may be required in each dimension, based on triangle positions. In one data-dependent scenario, a set of vertex positions may be narrow in the x-dimension, but wider in the y-dimension and z-dimensions. In such a situation, the x-dimension may require fewer bits of precision to represent an offset from the vertex anchor without loss.

Topology field 154 associates triangles with vertex position data. Each triangle may be associated with an application-specific triangle metadata (MD) value. A triangle metadata anchor subfield 166 indicates an anchor value for triangle metadata values for triangles stored within compression block 150. In one embodiment, triangle metadata anchor subfield 166 includes a thirty-two bit value. Triangle metadata offset subfield 164 includes a set of offset values that may be used in conjunction with triangle metadata anchor subfield 166 for associating a metadata value for each triangle stored within compression block 150. Each metadata offset value includes a number of bits specified by the P.MD subfield of precision subfield 160. For example, if the P.MD subfield specifies five bits, then each subfield within the triangle metadata offset subfield 164 includes five bits. In such an example, thirty-two bit metadata values for triangles stored within compression block 150 may be represented using only five bits each rather than thirty-two bits each. Each triangle stored within compression block 150 may be identified by a local index. The metadata value for triangle zero (local index=0) may be equal to the value of metadata anchor field 166. A metadata value for each remaining triangle (local index=1, 2, . . . ) within compression block 150 may be calculated by combining the value of triangle metadata anchor subfield 166 and a corresponding metadata offset from triangle metadata offset subfield 164.

In one embodiment, vertex IDs subfield 165 includes an alpha ($\alpha$) bit for each triangle within compression block 150 to indicate whether the triangle is fully opaque (or, alternatively, partially transparent). Furthermore, a set of three vertex indices is included within vertex IDs subfield 165 for each triangle 1 through M−1 within compression block 150. The three vertex indices of triangle 0 within compression block 150 may be fixed to values 0, 1, and 2. In one embodiment, each vertex index within a set of three vertex indices is allocated four bits (twelve bits per triangle), providing an index space for referencing sixteen different vertex positions. For a given triangle, a first vertex position is determined by a first vertex index into vertex positions field 152. A second vertex position is determined by a second vertex index into vertex positions field 152, and a third vertex position is determined by a third vertex index into vertex positions field 152.

In data-dependent scenarios where vertex positions are shared among triangles, as is common in meshes and fans, more triangles may fit within compression block 150 because fewer vertex positions may be needed per triangle. Furthermore, in scenarios where vertex positions may be represented as relatively small offsets to the vertex position anchor, fewer bits may be needed per vertex position offsets 169, and more triangles may fit within compression block 150. In certain scenarios, vertex positions are snapped to a grid, whereby lower mantissa values for the vertex positions are constant, thereby requiring fewer bits to represent position offsets 169. In each data-dependent scenario, subfields within 156 may be written to indicate an appropriate number of bits needed to represent vertex positions and an appropriate number of triangles. Furthermore, subfields within vertex position field 152 and topology field 154 are adjusted to be properly and contiguously packed. For example, triangle metadata offset subfield 164 includes (M−1)*P.MD bits, where M is a number of triangles and P.MD is the number of bits specified by the MD subfield within the precision subfield 160. Furthermore, vertex IDs subfield 165 includes (M−1)*13+1 bits. Additionally, vertex position offset subfield 168 includes (N−1)*(P.X+P.Y+P.Z) bits, where N corresponds to the total number of vertex positions represented in the compression block 150. Consequently, a highly variable (three to sixteen) number of triangles may fit within compression block 150. In other embodiments, compression block 150 includes a larger number of bits (e.g. 2048, 4096), and more triangles may be stored therein.

The process of generating compression block 150 may be performed using any technically feasible technique. For example, in ray-tracing systems that implement a bounding volume hierarchy (BVH) tree, triangles are organized according to spatial locality. In such a system, generating a compression block 150 with candidate triangles for compression involves linearly scanning through a list of triangles in BVH leaf order and adding sequential triangles to a compression block until no more triangles can fit. That is, if T triangles may be successfully encoded into the compression block then encoding T+1 triangles is attempted. If encoding T+1 succeeds, then encoding T+2 triangles is attempted, and so on. When encoding one more triangle fails, then the previous encoding is used. Each compression block 150 is self-contained in that vertex positions for each triangle are available. This approach preserves locality in that triangles that were near to each other in an uncompressed representation remain near each other after compression. In one embodiment, each compression block 150 is sized according to a host system's cache line size. In the above examples, this size is assumed to be 1024 bits, but the teachings disclosed herein will be readily understood by persons of ordinary skill in the art as being equally applicable to smaller cache lines (e.g., 512 bits), and larger cache lines (2048 bits, 4096 bits, or more).

Two different techniques may be used for encoding compression block 150. The first technique involves opportunistic indexing. The second technique is lossless delta encoding of vertex positions. Each of the two techniques may be implemented alone or in combination. In one embodiment, both techniques are implemented to generate compression block 150.

Opportunistic indexing involves checking whether a newly added triangle shares any vertices with any other triangles already added to compression block 150. If any vertices are shared, then the shared vertex positions are referenced rather than explicitly added as new vertex offset positions 169 when including the newly added triangle to compression block 150.

In one embodiment, lossless delta encoding involves encoding floating-point values associated with a particular dimension (x, y, z) relative to corresponding values for the anchor position. For example, encoding a new floating-point value associated with the x-dimension involves encoding the new value relative to a floating-point anchor position value for the x-dimension. If the new value and the anchor position value are close to each other, their binary representations typically differ only in some number of the lowest-order bits. For example, a bit-wise difference between two nearby floating-point values frequently requires less than twenty-three bits. The X subfield of precision subfield 160 (P.X) indicates how many bits are necessary to store all vertex position offsets in the x-dimension without loss for triangles stored within compression block 150. Similarly, the Y subfield of precision subfield 160 (P.Y) indicates how many bits are necessary to store all vertex position offsets in the y-dimension without loss for triangles stored within compression block 150, and the Z subfield of precision subfield 160 (P.Z) indicates how many bits are necessary to store all vertex position offsets in the z-dimension without loss. The value for each subfield P.X, P.Y, and P.Z is data-dependent and may vary accordingly.

While the embodiments described above illustrate an implementation for a floating-point geometric data type for vertex position information, persons skilled in the art will recognize that the teachings disclosed herein may also be applied equally to other data types such as fixed-point and integer data types.

The above technique for compressing vertex data into compression blocks generates compression blocks that contain a potentially variable number of vertices and triangles each. If random access to this data is needed, a mechanism for mapping global primitive indices to compression blocks and further to individual triangle primitives through local indices within the compression blocks is needed. This mapping is achieved using an indirection data structure that comprises a set of indirection blocks. Each such indirection block stores a header field and a payload field that includes one bit per triangle. The one bit per triangle indicates whether a corresponding triangle begins a new compression block. The header identifies a compression block by index and a local index within the identified compression block for the first triangle of the indirection block.

Figure 1D:
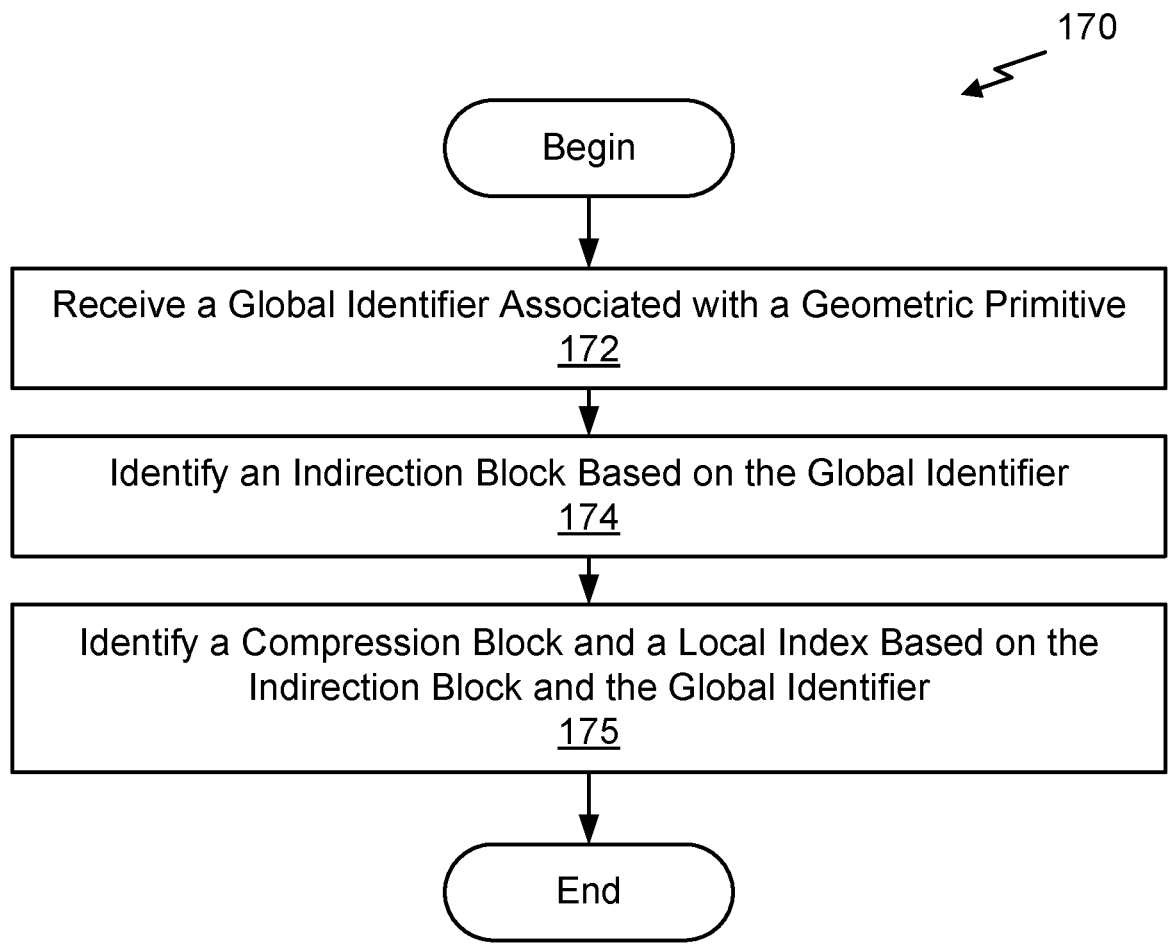
FIG. 1D illustrates a flowchart of a method for identifying a compression block based on a global identifier, in accordance with one embodiment.

FIG. 1D illustrates a flowchart of a method 170 for identifying a compression block based on a global identifier, in accordance with one embodiment. Although method 170 is described in conjunction with the systems of FIGS. 1G-4, persons of ordinary skill in the art will understand that any system that performs method 170 is within the scope of embodiments of the present invention. In one embodiment, a decompression unit, such as decompression unit 196 of FIG. 1G is configured to perform method 170. The decompression unit may reside within memory partition unit 280 of FIG. 2, or within any other technically feasible circuitry associated with parallel processing unit (PPU) 200 of FIG. 2. In other embodiments, the decompression unit may reside within any technically feasible functional unit or units associated with a computer system architecture. The decompression unit may be implemented using function-specific logic circuitry, such as a function-specific portion of a processing pipeline configured to perform at least method 170. In one embodiment, the decompression unit is realized by reconfigurable logic that may include (but is not restricted to) field programmable gate arrays (FPGAs). Alternatively, the decompression unit may be implemented as instructions or microcode for controlling a processing unit. The instructions may be encoded within non-transitory computer-readable medium such as a read-only solid-state memory or a programmable solid-state flash memory.

Method 170 begins at step 172, where the decompression unit receives a global identifier associated with a geometric primitive. In one embodiment, the global identifier comprises a global triangle index and the geometric primitive comprises a triangle. At step 174, the decompression unit identifies an indirection block based on the global identifier. At step 175, the decompression unit identifies a compression block and a local index based on the global identifier and the indirection block. An exemplary data structure for implementing method 170 is described below in FIGS. 1E and 1F.

Figure 1E:
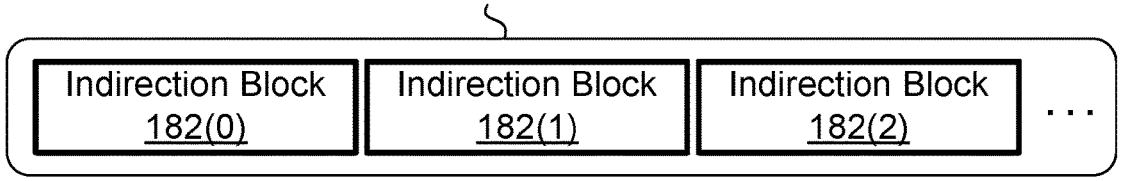
FIG. 1E illustrates an indirection data structure comprising a plurality of indirection blocks, in accordance with one embodiment.

FIG. 1E illustrates an indirection data structure 180 comprising a plurality of indirection blocks 182, in accordance with one embodiment. Each indirection block 182 may include a number of bits equal to a cache line size. For example, each indirection block 182 may include one-thousand twenty-four (1024) bits for systems with cache lines sized to have 1024 bits. Indirection data structure 180 may include a number of indirection blocks 182 depending on the number of global identifiers needed to represent a complete scene. Each sequential indirection block 182 may be identified as having an indirection block number, and may be disposed in corresponding contiguous memory addresses, or further mapped through another level of indirection that maps an indirection block number to an indirection block 182 at a memory location.

Figure 1F:
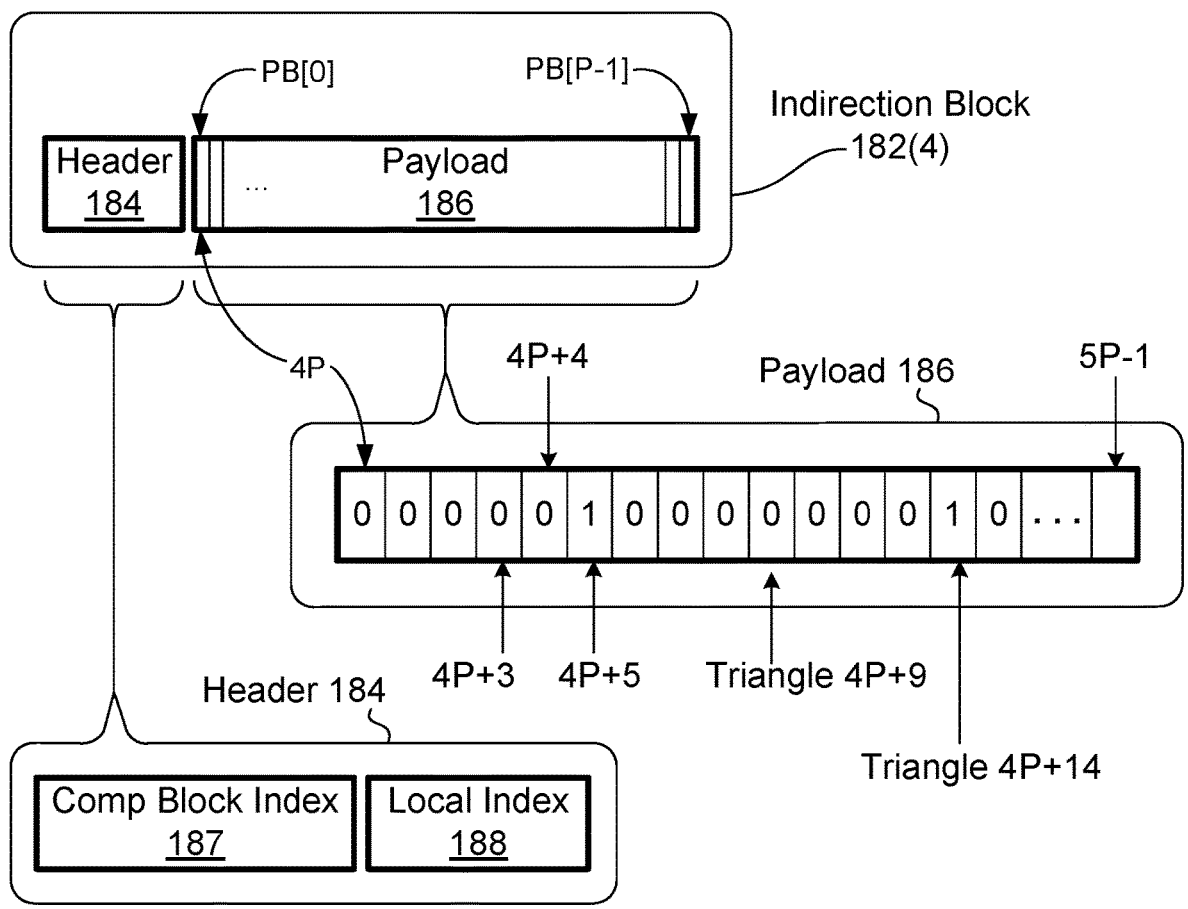
FIG. 1F illustrates an exemplary structure of an indirection block, in accordance with one embodiment.
Figure 1G:
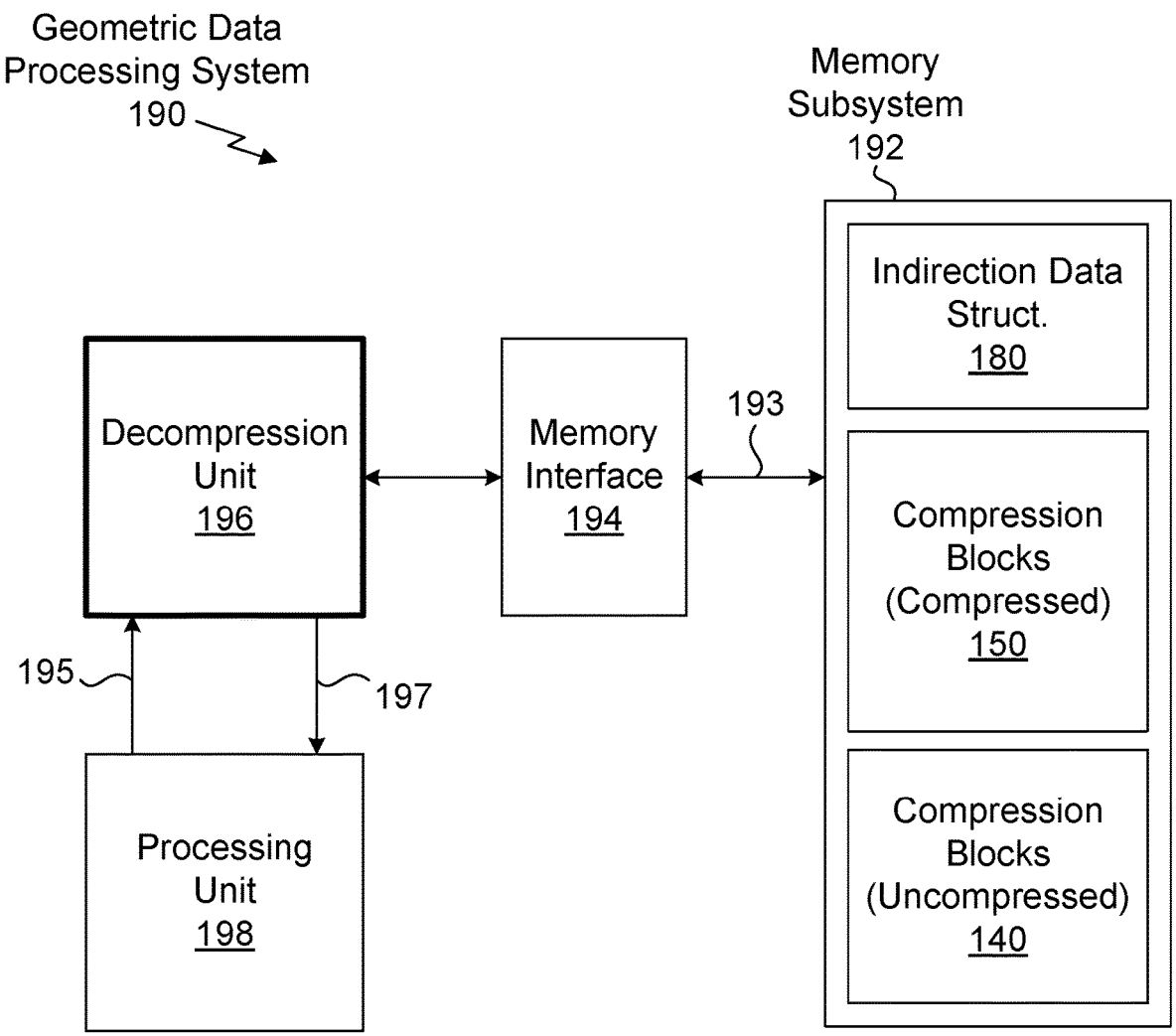
FIG. 1G illustrates a geometric data processing system configured to decompress geometric data from a compression block residing within memory, in accordance with one embodiment.

FIG. 1F illustrates an exemplary structure of an indirection block 182, in accordance with one embodiment. As shown, each indirection block 182 includes a header field 184 and a payload field 186. Header field 184 comprises a compression block index subfield 187, and a local index subfield 188. Payload field 186 includes a number of bits (P) equal to line size (L, e.g. 1024 bits) minus header size (H). Each payload bit corresponds to a unique global identifier number and may further correspond to a geometric primitive identified by the global identifier number. Within any one indirection block 182, bits within payload field 186 may be identified as payload bit 0 or PB[0] through payload bit P−1 or PB[P−1].

To allocate a sufficient number of indirection blocks 182 to provide one payload bit per global identifier number in a scene, indirection data structure 180 may include a number of indirection blocks 182 equal to the number of global identifiers in the scene divided by the number of payload bits (P), with the resulting quotient rounded up to the next integer. In such a configuration, a first indirection block 182(0) includes P payload bits corresponding to global identifier values from 0 to P−1; a second indirection block 182(1) includes P payload bits corresponding to global identifier values from P to 2P−1; a third indirection block 182(2) includes P payload bits corresponding to global identifier values from 2P to 3P−1, and so forth. A fixed mapping from a global identifier (e.g., a global triangle index) to an indirection block 182 may be performed by dividing the global identifier by the number of payload bits (P) and rounding the quotient down to the nearest integer. In one embodiment, the fixed mapping is performed in step 174 of method 170.

The mapping from a global identifier to an indirection block 182 is fixed and direct. For example, a global identifier within the range of 4P to 5P−1 will map directly to a fifth indirection block 182(4). However, mapping the global identifier further from indirection block 182(4) to a specific compression block 150 is variable because a variable number of compression blocks 150 may be needed to store geometric data for the geometric primitives (e.g. triangles) preceding, in order, the geometric primitive identified by the global identifier number. Such variability depends on the actual geometric data values and their compressibility.

As shown, indirection block 182(4) includes payload bits PB[0] through PB[P−1], corresponding to global identifiers 4P through 5P−1. To map an arbitrary global identifier in the range 4P to 5P−1, the payload bits of indirection block 182(4) need to be examined along with header field 184. A compression block 150 is identified by compression block index subfield 187. Global identifiers ranging from 4P to the first occurrence of a payload bit value of one ("1") map into this identified compression block 150. Local index subfield 188 indicates how many global identifiers are mapped to the identified compression block 150 from a prior indirection block 182. Thus, local index subfield 188 provides an offset for locating geometric data within the identified compression block 150.

In one example, compression block index subfield 187 contains the value one-hundred ninety-seven ("197") and local index field 188 contains the value three ("3"). As shown, a global identifier with value 4P maps to compression block number "197", with a local index of "3". In other words, geometric objects 0, 1, and 2 stored in compression block number "197" are associated with a previous indirection block 182 mapping. Furthermore, global identifiers 4P through 4P+4 are mapped to compression block number "197" with corresponding local index values of "3" through "7", respectively. Global identifiers in the range 4P+5 through 4P+13 map to compression block number "198" with local index values "0" through "7", respectively. For example, global identifier 4P+9 may be assigned a local index value of "4". Global identifier 4P+14 maps to compression block number "199", and so forth.

In one embodiment, method 170 performs step 175 in the context of the above description for indirection data structure 180 and indirection block 182.

FIG. 1G illustrates a geometric data processing system 190 configured to decompress geometric data from compression blocks residing within memory, in accordance with one embodiment. As shown, geometric data processing system 190 comprises a decompression unit 196 coupled to a processing unit 198 and to a memory interface 194, which may be further coupled to a memory subsystem 192. In one embodiment, one or more of the decompression unit 196, the processing unit 198, and the memory interface 194 is realized by reconfigurable logic that may include (but is not restricted to) FPGAs. Processing unit 198 may include a multi-threaded processor, such as a multi-threaded processor comprising a graphics processing unit (GPU). In one embodiment, processing unit 198 is configured to perform graphics rendering based on ray-tracing of scene data comprising triangles that are organized within a BVH. Data for the triangles may be stored in a compressed format within compression blocks 150, as described in FIG. 1C. Furthermore, certain data for the triangles within the BVH may be stored in an uncompressed format within compression blocks 140, as described in FIG. 1B. Triangles stored in compression blocks 140 may be poorly suited for compression using the techniques disclosed herein, while triangles stored in compression blocks 150 may be more suitable for compression.

Processing unit 198 may generate access requests 195 to receive decompressed triangle data 197 corresponding to compressed triangle vertex data residing within compression blocks 150. Access requests 195 may comprise a global triangle index per triangle requested. Alternatively, an access request may include a compression block index and a local index for embodiments where direct access to compression blocks is provided without indirection. Decompressed triangle data 197 may comprise three-dimensional vertex position information represented as numeric values in each of three dimensions. As discussed previously, the numeric values may be represented as floating-point numbers. Decompression unit 196 may perform method 170 to identify a specific compression block 150 as an access request target based on a global triangle index. Method 170 may access indirection data structure 180 to identify the specific compression block 150. Decompression unit 196 may then perform method 100 to decompress vertex data to generate decompressed triangle data 197.

Memory interface 194 may operate to receive access requests from decompression unit 196 and generate appropriate media-specific signals 193, such as DRAM control protocol signals for accessing memory subsystem 192. In certain embodiments, decompression unit 196 resides within a memory control subsystem, such as a memory partition unit 280(U) of FIG. 2. Memory interface 194 may further include an additional port (not shown) for receiving conventional access requests from processing unit 198. Memory interface 194 may include cache memory for caching blocks of data residing within memory subsystem 192. Similarly, decompression unit 196 and processing unit 198 may each include cache memory for caching related data, such as decompressed triangle data 197.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

System Overview

Figure 2:
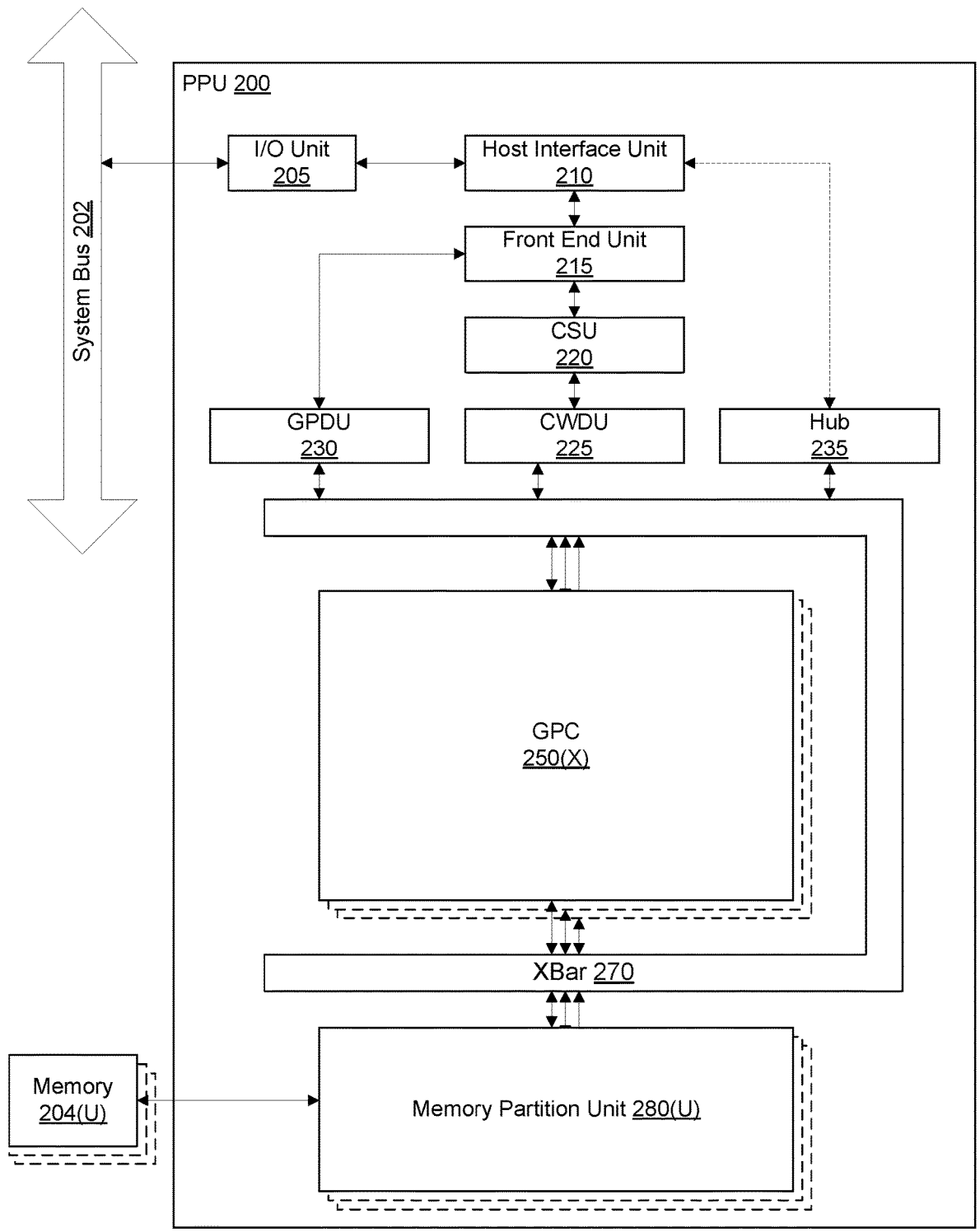
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a compute scheduler unit (CSU) 220, a compute work distribution unit (CWDU) 225, a graphics primitive distribution unit (GPDU) 230, a hub 235, a crossbar (Xbar) 270, one or more general processing clusters (GPCs) 250, and one or more memory partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 235 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and pointers to data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 manages the scheduling of instructions from one or more command streams written by the host processor (i.e., channels) on the various sub-units of the PPU 200.

The front end unit 215 receives instructions from the host interface unit 210 from one or more command streams and forwards those instructions to the correct sub-unit of the PPU 200. Instructions associated with a compute pipeline may be received by the front end unit 215. These compute instructions are then forwarded to a compute scheduler unit 220. The compute scheduler unit 220 is configured to track state information related to the various tasks managed by the compute scheduler unit 220. The state may indicate which GPC 250 a task is assigned to, whether the task is active or inactive, a priority level associated with the task, and so forth. The compute scheduler unit 220 manages the execution of a plurality of tasks on the one or more GPCs 250.

The compute scheduler unit 220 is coupled to a compute work distribution unit 225 that is configured to dispatch tasks for execution on the GPCs 250. The compute work distribution unit 225 may track a number of scheduled tasks received from the compute scheduler unit 220. In one embodiment, the compute work distribution unit 225 manages a pending task pool and an active task pool for each of the GPCs 250. The pending task pool may comprise a number of slots (e.g., 16 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

Returning to the front end unit 215, instructions associated with a graphics pipeline may be received by the front end unit 215. These graphics instructions are then forwarded to a graphics primitive distribution unit 230. The graphics primitive distribution unit 230 fetches vertex data from the memory 204 or the system memory via the system bus 202 for various graphics primitives. Graphics primitives may include points, lines, triangles, quads, triangle strips, and the like. The graphics primitive distribution unit 230 groups the vertices into batches of primitives and dispatches tasks to the GPCs 250 for processing the batches of primitives. Processing may involve executing a shader (i.e., a Vertex Shader, Tessellation Shader, Geometry Shader, etc.) on a programmable processing unit as well as performing fixed function operations on the vertices such as clipping, culling, and viewport transformation using a fixed function unit.

The compute work distribution unit 225 and the graphics primitive distribution unit 230 communicate with the one or more GPCs 250 via a XBar 270. The XBar 270 is an interconnect network that couples many of the units of the PPU 200 to other units of the PPU 200. For example, the XBar 270 may be configured to couple the compute work distribution unit 225 to a particular GPC 250. Although not shown explicitly, one or more other units of the PPU 200 are coupled to the host unit 210. The other units may also be connected to the XBar 270 via a hub 235.

The tasks associated with the compute pipeline are managed by the compute scheduler unit 220 and dispatched to a GPC 250 by the compute work distribution unit 225. The tasks associated with the graphics pipeline are managed and distributed to a GPC 250 by the graphics primitive distribution unit 230. The GPC 250 is configured to process the tasks and generate results. The results may be consumed by other tasks within the GPC 250, routed to a different GPC 250 via the XBar 270, or stored in the memory 204. The results can be written to the memory 204 via the memory partition units 280, which implement a memory interface for reading and writing data to/from the memory 204. In one embodiment, the PPU 200 includes a number U of memory partition units 280 that is equal to the number of separate and distinct memory devices 204 coupled to the PPU 200.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same thread block may exchange data through shared memory. In one embodiment, a warp comprises 32 related threads.

Figure 3:
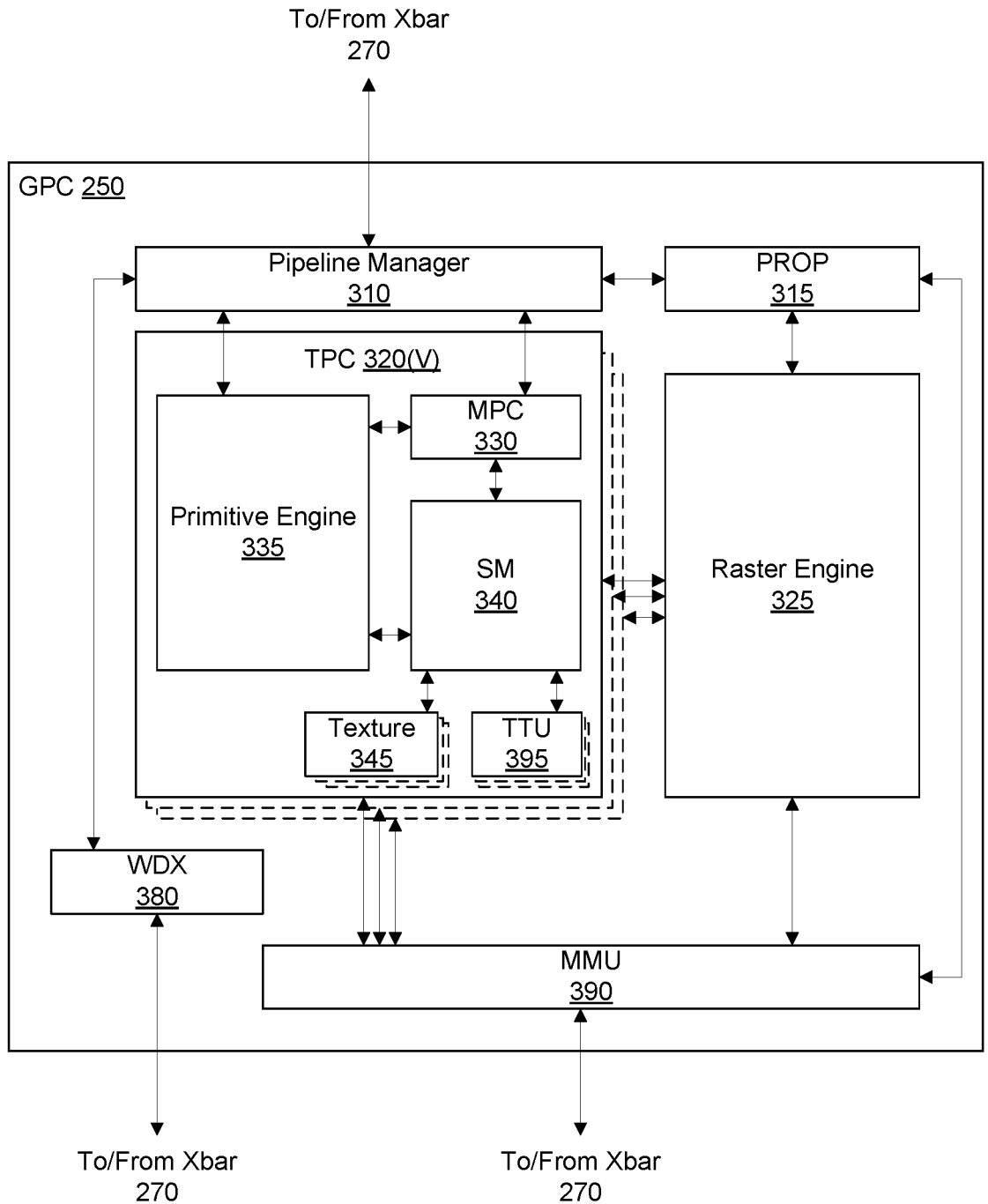
FIG. 3 illustrates a general processing cluster of the parallel processing unit of FIG. 2, in accordance with one embodiment.

FIG. 3 illustrates a GPC 250 of the PPU 200 of FIG. 2, in accordance with one embodiment. As shown in FIG. 3, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3 may include other hardware units in lieu of or in addition to the units shown in FIG. 3.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the Xbar 270 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the memory partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a coarse raster engine, a culling engine, a clipping engine, a fine raster engine, and a tile coalescing engine. Primitives lying outside a viewing frustum may be clipped by the clipping engine. The setup engine receives transformed vertices that lie within the viewing plane and generates edge equations associated with the geometric primitive defined by the vertices. The edge equations are transmitted to the coarse raster engine to determine the set of pixel tiles covered by the primitive. The output of the coarse raster engine may be transmitted to the culling engine where tiles associated with the primitive that fail a hierarchical z-test are culled. Those fragments that survive culling may be passed to a fine raster engine to generate coverage information (e.g., a coverage mask for each tile) based on the edge equations generated by the setup engine. The output of the raster engine 380 comprises fragments to be processed, for example, by a fragment shader implemented within a TPC 320.

Each TPC 320 included in the GPC 250 includes an M-Pipe Controller (MPC) 330, a primitive engine 335, an SM 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). In one embodiment, each TPC 320 includes two (2) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction.

The MMU 390 provides an interface between the GPC 250 and the memory partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

The PPU 200 described above may be configured to perform highly parallel computations much faster than conventional CPUs. Parallel computing has advantages in graphics processing, data compression, biometrics, stream processing algorithms, and the like.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be executed on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

In one embodiment, TPC 320 includes one or more tree traversal units (TTUs) 395, in accordance with one embodiment. The TTUs 395 are each configured to perform tree traversal operations. Tree traversal operations are commonly utilized in, for example, ray tracing algorithms in computer graphics. However, the TTUs 395 may be optimized for general tree traversal operations and are not limited, specifically, to ray tracing techniques.

In one embodiment, each TPC 320 included in the PPU 200 may include one or more TTUs 395 for performing tree traversal operations. The TTUs 395 are coupled to the SM 340 similar to the texture units 345. Alternately, one or more TTUs 395 may be implemented within the PPU 200 and shared by one or more GPCs 250 or one or more SMs 340.

A tree traversal operation may include any operation performed by traversing the nodes of a tree data structure. A tree data structure may include, but is not limited to, a binary tree, an octree, a four-ary tree, a k-d tree, a binary space partitioning (BSP) tree, and a bounding volume hierarchy (BVH) tree. In one embodiment, the tree traversal operation includes a number of instructions for intersection a query shape with the tree. The query shapes may be, e.g., rays, bounding boxes, frustums, cones, spheres, and the like. In various embodiments, a query shape may be specified by a query data structure. The query data structure may include any technically feasible technique for specifying the query shape to intersect with the tree. For example, the query data structure may specify the starting and ending points of a ray using two three-coordinate vectors. In another example, the query data structure may specify the six planes of an axis-aligned bounding box using six 32-bit floating point coordinates. The various query data structures may include any number of fields for specifying the attributes of the query shape.

For example, one type of tree traversal operation for which the TTU 395 may be optimized is to intersect a ray with a BVH data structure that represents each of the geometric primitives in a 3D scene or 3D model. The TTU 395 may be particularly useful in ray-tracing applications in which millions or even billions of rays are intersected with the geometric primitives of a 3D model represented by a BVH data structure.

Exemplary System

Figure 4:
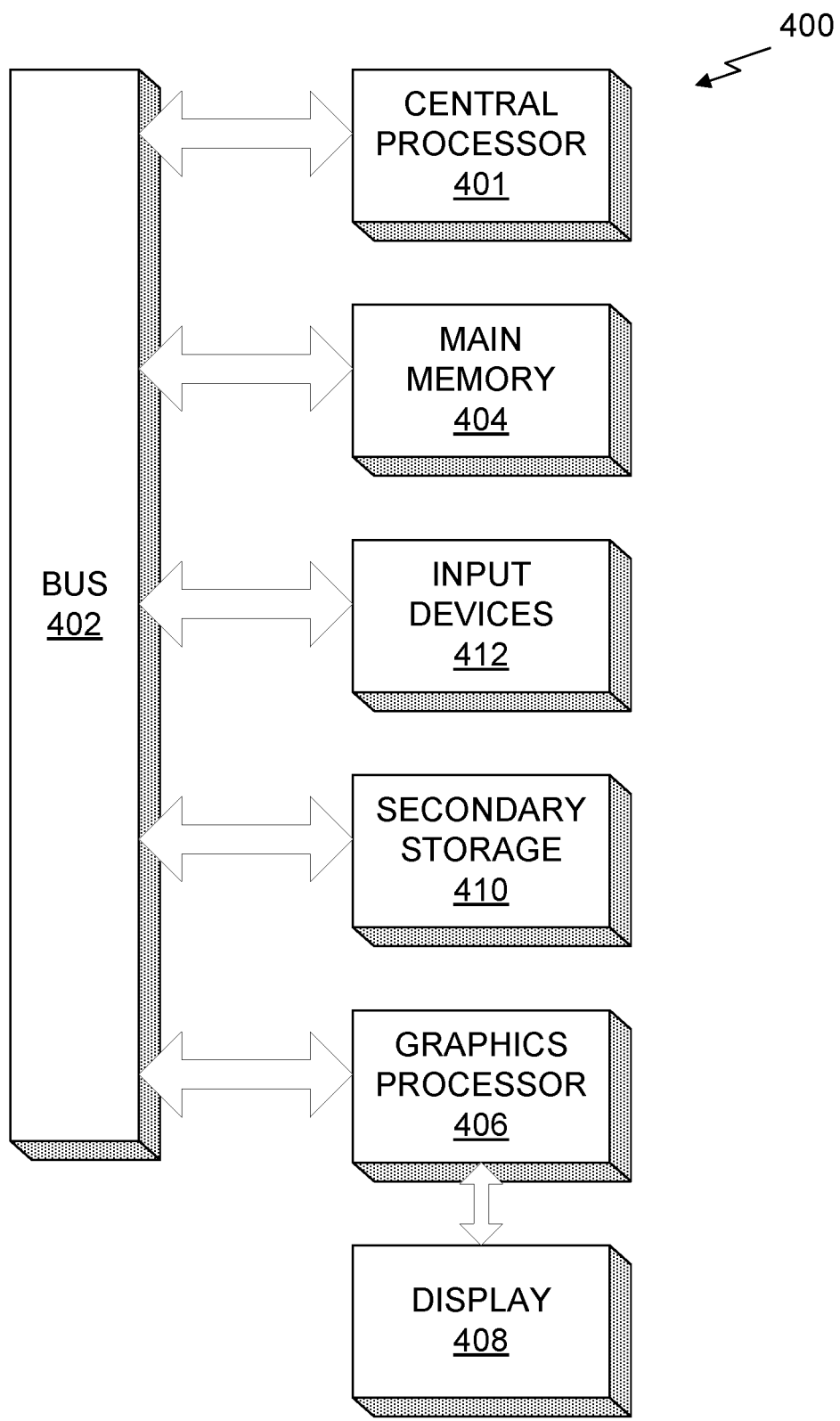
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one central processor 401 that is connected to a communication bus 402. The communication bus 402 may be implemented using any suitable protocol, such as PCI (Peripheral Component Interconnect), PCI-Express, AGP (Accelerated Graphics Port), HyperTransport, or any other bus or point-to-point communication protocol(s). The system 400 also includes a main memory 404. Control logic (software) and data are stored in the main memory 404 which may take the form of random access memory (RAM).

The system 400 also includes input devices 412, a graphics processor 406, and a display 408, i.e. a conventional CRT (cathode ray tube), LCD (liquid crystal display), LED (light emitting diode), plasma display or the like. User input may be received from the input devices 412, e.g., keyboard, mouse, touchpad, microphone, and the like. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 400 may also include a secondary storage 410. The secondary storage 410 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 404 and/or the secondary storage 410. Such computer programs, when executed, enable the system 400 to perform various functions. The memory 404, the storage 410, and/or any other storage are possible examples of non-transitory computer-readable media.

In one embodiment, the architecture and/or functionality of the various previous figures may be implemented in the context of the central processor 401, the graphics processor 406, an integrated circuit (not shown) that is capable of at least a portion of the capabilities of both the central processor 401 and the graphics processor 406, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, laptop computer, server, workstation, game consoles, embedded system, and/or any other type of logic. Still yet, the system 400 may take the form of various other devices including, but not limited to a personal digital assistant (PDA) device, a mobile phone device, a television, etc.

Further, while not shown, the system 400 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving an identifier for a first geometric primitive of a number of geometric primitives enclosed within a bounding volume of a bounding volume hierarchy;
accessing a data structure stored in a memory using the identifier to read a compression block index and a local index for the first geometric primitive;
identifying, based on the compression block index and the local index, a location within a compression block of a first set of compressed geometric data for the first geometric primitive, wherein three-dimensional position offsets relative to a three-dimensional anchor position associated with the bounding volume are included within the compression block; and generating a first set of decompressed geometric data for the first geometric primitive by decompressing the first set of compressed geometric data, based on at least the three-dimensional position offsets and the three-dimensional anchor position, wherein a first vertex of the first geometric primitive is shared with another geometric primitive in the compression block defined by a second vertex and, during compression, a reference to a position of the second vertex within the compression block is stored instead of a three-dimensional position offset, and wherein the first set of decompressed geometric data comprises more bits of data than the first set of compressed geometric data.

2. The method of claim 1, wherein the compression block includes a mode subfield that controls interpretation of bits in the compression block according to two or more enumerated formats.

3. The method of claim 2, wherein at least one of the two or more enumerated formats includes an uncompressed format and at least one of the two or more enumerated formats includes a compressed format.

4. The method of claim 1, wherein the compressed geometric data includes bit precisions for each one of the three dimensions.

5. The method of claim 1, wherein the first set of decompressed geometric data is generated for the first geometric primitive without shifting the three-dimensional position offsets.

6. The method of claim 1, wherein the compressed geometric data includes a topology field comprising vertex identifiers, and three different vertex identifiers are associated with at least the first geometric primitive, wherein each vertex identifier references either one of the three-dimensional position offsets or the three-dimensional anchor position.

7. The method of claim 1, wherein the compressed geometric data includes a topology field comprising alpha bits, and a first alpha bit indicates whether the first geometric primitive is fully opaque or partially transparent.

8. The method of claim 1, wherein the compressed geometric data includes a topology field comprising a number of primitive metadata values equal to the number of geometric primitives, each primitive metadata value including a number of bits indicated by a precision subfield within the compression block.

9. The method of claim 1, wherein the identifier determines an indirection block number that identifies an indirection block including the compression block index and the local index for the first geometric primitive.

10. The method of claim 9, wherein the indirection block number is determined by dividing the value of the identifier with a number of payload bits and rounding the quotient down to the nearest integer.

11. The method of claim 9, wherein the indirection block indicates a beginning geometric primitive in the compression block.

12. The method of claim 1, wherein the compressed geometric data includes a value that specifies the number of bits of the three-dimensional anchor position that are replaced by each one of the three-dimensional position offsets to generate the three-dimensional vertex position.

13. The method of claim 1, further comprising intersecting the bounding volume with a query shape during rendering.

14. The method of claim 1, wherein the compression block is generated by linearly scanning through a list of geometric primitives in BVH leaf order and adding each compressed geometric primitive to the compression block in sequence until a next compressed geometric primitive in the sequence cannot fit in the compression block.

15. A system, comprising:
a memory configured to store a data structure; and
a processor configured to:
generate an identifier for a first geometric primitive of a number of geometric primitives enclosed within a bounding volume of a bounding volume hierarchy;
access the data structure using the identifier to read a compression block index and a local index for the first geometric primitive;
identify, based on the compression block index and the local index, a location within a compression block of a first set of compressed geometric data for the first geometric primitive, wherein three-dimensional position offsets relative to a three-dimensional anchor position associated with the bounding volume are included within the compression block; and
generate a first set of decompressed geometric data for the first geometric primitive by decompressing the first set of compressed geometric data, based on at least the three-dimensional position offsets and the three-dimensional anchor position,
wherein a first vertex of the first geometric primitive is shared with another geometric primitive in the compression block defined by a second vertex and, during compression, a reference to a position of the second vertex within the compression block is stored instead of a three-dimensional position offset, and
wherein the first set of decompressed geometric data comprises more bits of data than the first set of compressed geometric data.

16. The system of claim 15, wherein the compressed geometric data includes bit precisions for each one of the three dimensions.

17. The system of claim 15, wherein the compressed geometric data includes a topology field comprising a number of primitive metadata values equal to the number of geometric primitives, each primitive metadata value including a number of bits indicated by a precision subfield within the compression.

18. The system of claim 15, further comprising a caching system with cache lines configured to store a number of cache line bits, and the compression block includes the number of cache line bits.

19. The System of claim 15, wherein the compression block is generated by linearly scanning through a list of geometric primitives in BVH leaf order and adding each compressed geometric primitive to the compression block in sequence until a next compressed geometric primitive in the sequence cannot fit in the compression block.

20. A non-transitory computer-readable storage medium storing instructions that, when executed by a processor, cause the processor to perform steps comprising:
receiving an identifier for a first geometric primitive of a number of geometric primitives enclosed within a bounding volume of a bounding volume hierarchy;
accessing a data structure stored in a memory using the identifier to read a compression block index and a local index for the first geometric primitive;
identifying, based on the compression block index and the local index, a location within a compression block of a first set of compressed geometric data for the first geometric primitive, wherein three-dimensional position offsets relative to a three-dimensional anchor position associated with the bounding volume are included within the compression block; and generating a first set of decompressed geometric data for the first geometric primitive by decompressing the first set of compressed geometric data, based on at least the three-dimensional position offsets and the three-dimensional anchor position, wherein a first vertex of the first geometric primitive is shared with another geometric primitive in the compression block defined by a second vertex and, during compression, a reference to a position of the second vertex within the compression block is stored instead of a three-dimensional position offset, and wherein the first set of decompressed geometric data comprises more bits of data than the first set of compressed geometric data.

21. The non-transitory computer-readable storage medium of claim 20, wherein the compression block is generated by linearly scanning through a list of geometric primitives in BVH leaf order and adding each compressed geometric primitive to the compression block in sequence until a next compressed geometric primitive in the sequence cannot fit in the compression block.

22. A method, comprising:

receiving an identifier for a first geometric primitive of a number of geometric primitives enclosed within a bounding volume of a bounding volume hierarchy (BVH);

accessing a data structure stored in a memory using the identifier to read a compression block index and a local index for the first geometric primitive;

identifying, based on the compression block index and the local index, a location within a compression block of a first set of compressed geometric data for the first geometric primitive, wherein three-dimensional position offsets relative to a three-dimensional anchor position associated with the bounding volume are included within the compression block; and generating a first set of decompressed geometric data for the first geometric primitive by decompressing the first set of compressed geometric data, based on at least the three-dimensional position offsets and the three-dimensional anchor position, wherein the compression block is generated by linearly scanning through a list of geometric primitives in BVH leaf order and adding each compressed geometric primitive to the compression block in sequence until a next compressed geometric primitive in the sequence cannot fit in the compression block, and wherein the first set of decompressed geometric data comprises more bits of data than the first set of compressed geometric data.

23. A system, comprising:
a memory configured to store a data structure; and
a processor configured to:
generate an identifier for a first geometric primitive of a number of geometric primitives enclosed within a bounding volume of a bounding volume hierarchy;

access the data structure using the identifier to read a compression block index and a local index for the first geometric primitive;

identify, based on the compression block index and the local index, a location within a compression block of a first set of compressed geometric data for the first geometric primitive, wherein three-dimensional position offsets relative to a three-dimensional anchor position associated with the bounding volume are included within the compression block; and generate a first set of decompressed geometric data for the first geometric primitive by decompressing the first set of compressed geometric data, based on at least the three-dimensional position offsets and the three-dimensional anchor position, wherein the compression block is generated by linearly scanning through a list of geometric primitives in BVH leaf order and adding each compressed geometric primitive to the compression block in sequence until a next compressed geometric primitive in the sequence cannot fit in the compression block, and wherein the first set of decompressed geometric data comprises more bits of data than the first set of compressed geometric data.

24. A non-transitory computer-readable storage medium storing instructions that, when executed by a processor, cause the processor to perform steps comprising:

receiving an identifier for a first geometric primitive of a number of geometric primitives enclosed within a bounding volume of a bounding volume hierarchy;

accessing a data structure stored in a memory using the identifier to read a compression block index and a local index for the first geometric primitive;

identifying, based on the compression block index and the local index, a location within a compression block of a first set of compressed geometric data for the first geometric primitive, wherein three-dimensional position offsets relative to a three-dimensional anchor position associated with the bounding volume are included within the compression block; and generating a first set of decompressed geometric data for the first geometric primitive by decompressing the first set of compressed geometric data, based on at least the three-dimensional position offsets and the three-dimensional anchor position, wherein the compression block is generated by linearly scanning through a list of geometric primitives in BVH leaf order and adding each compressed geometric primitive to the compression block in sequence until a next compressed geometric primitive in the sequence cannot fit in the compression block, and wherein the first set of decompressed geometric data comprises more bits of data than the first set of compressed geometric data.

\* \* \* \* \*